United States Patent [19]

Aubry et al.

[11] Patent Number: 5,011,373
[45] Date of Patent: Apr. 30, 1991

[54] INDIVIDUAL PITCH CONTROL DEVICE FOR BLADES OF ROTORS OF ROTOR CRAFT BY MEANS OF ROTATING LINEAR JACKS

[75] Inventors: Jacques A. Aubry, Cabries; Jean J. Mondet, Pelisanne, both of France

[73] Assignee: aerospatiale Societe Nationale Industrielle, Paris Cedex, France

[21] Appl. No.: 405,264

[22] Filed: Sep. 11, 1989

[30] Foreign Application Priority Data

Sep. 16, 1988 [FR] France .............................. 88 12142

[51] Int. Cl.$^5$ ...................... B63H 3/00; B64C 11/00
[52] U.S. Cl. .................... 416/108; 416/115; 416/156
[58] Field of Search ............... 416/114, 98, 158, 115, 416/108, 147, 154, 155, 156, 157 R, 157 A, 33

[56] References Cited

U.S. PATENT DOCUMENTS

| | | | |
|---|---|---|---|
| 2,151,216 | 3/1939 | Larsen | 416/158 |
| 2,812,026 | 11/1957 | Braddon | 416/157 |
| 2,988,153 | 6/1961 | Haworth et al. | 416/43 |
| 3,303,887 | 1/1965 | Pfleiderer | 416/158 |
| 3,603,697 | 9/1971 | Lane | 416/157 R |
| 3,765,794 | 10/1973 | Kudasch et al. | 416/114 |
| 3,960,348 | 6/1976 | Fowler et al. | 416/43 |
| 4,379,678 | 4/1983 | Carlock et al. | 416/98 |
| 4,854,219 | 8/1989 | Hockaday et al. | 91/358 R |

FOREIGN PATENT DOCUMENTS

| | | | |
|---|---|---|---|
| 2607465 | 6/1988 | France . | |
| 0129962 | 8/1982 | Japan | 92/187 |
| 704809 | 3/1954 | United Kingdom | 416/33 |

OTHER PUBLICATIONS

Journal of the American Hellicopter Society, vol. 27, No. 3, Juillet 1982, pp. 25-31, New York, US; K. F. Guinn; "Individual Blade Control Independent of a Swashplate".

Primary Examiner—Edward K. Look
Assistant Examiner—Hoang Nguyen
Attorney, Agent, or Firm—Armstrong, Nikaido, Marmelstein, Kubovcik & Murray

[57] ABSTRACT

An individual pitch control device for the blades (7) of a rotor of a rotor craft employing respective rotating linear jacks (29) for controlling the pitch of the rotor blades. The linear jacks are implanted in a rotating support (25) which is driven in rotation with the rotor. The jacks (29) include rods (31) which are connected via additional rods (33) to drive pitch control levers (24) for each respective blade. The jacks (29) are linear, electrohydraulic, dual-action jacks having at least one body, and are supplied by control servovalves (36) which are also mounted in a rotating reference system. The servovalves (36) are supplied from a hydraulic circuit in a fixed reference system positioned on the rotor craft, having at least one hydraulic collector (27) which is at least partially rotating.

25 Claims, 3 Drawing Sheets

INDIVIDUAL PITCH CONTROL DEVICE FOR BLADES OF ROTORS OF ROTOR CRAFT BY MEANS OF ROTATING LINEAR JACKS

The present invention relates to an individual pitch control device for the blades of rotors, in particular main or supporting rotors, of rotor crafts or, more generally, aerodynes with a wing unit which is at least partially rotating, such as helicopters and aerodynes of the types called "convertible" or "combined".

The invention relates more precisely to an individual pitch control device for blades of rotors by means of rotating linear jacks, each of which controls the position of one of the blades of the rotor about its pitch change axis, so as to ensure, in a rotating reference system and for each blade, its control of general or collective pitch and of monocyclic pitch, to which may be added, if necesary, a multicyclic pitch control.

The device according to the invention is essentially intended for the equipment of the main rotors of helicopters or of combined aerodynes and of tilt propellers or tilt rotors of convertible aerodynes, which are variable pitch rotors, in order to permit the control of the blades of these rotors in order to, on the one hand, ensure a control which is similar to conventional control of the rotor or rotors in question by the introduction of general or collective pitch which control is constant regardless of the azimuth of a given blade in rotation but variable simultaneously for all the blades of a rotor, and also of the cyclic or monocyclic pitch, which varies sinusoidally once per revolution of said blade and, on the other hand, to possibly permit the addition to the variations in general pitch and in monocyclic pitch of any dynamic variation of the pitch in order to ensure the multicyclic control of the rotor or rotors in question.

Such an independent control for each blade makes it possible, on the one hand, to optimize the monocyclic control of the rotor or rotors and, on the other hand, by means of the multicyclic control of the blade, to introduce on the rotor or rotors an active vibration control system, these arrangements contributing great antivibrational efficiency and considerable gains in performance, in particular at high speeds.

It is known that the control of helicopters is conventionally obtained, on the one hand, by means of the control of the general pitch of the blades of each main rotor, this control making it possible to vary the overall lift of the rotor and, on the other hand, by means of the monocyclic control of the pitch of the blades of each main rotor, making it possible to tilt the disk of the rotor, the combination of these two controls on the incidence of these blades resulting in the possibility of varying the amplitude and the tilt of the mean resulting stress developed by the rotor and, consequently, of controlling the helicopter supported by this rotor.

These conventional controls are introduced on most helicopters flying today by means of a complex swashplate device, these plates making it possible to simultaneously create on the blades of the main rotor, on the one hand, the control of the general pitch of the blades by the axial displacement of the swashplates according to the axis of the rotor and, on the other hand, the sinusoidal control of the pitch or monocyclic control, the pulsation of which is equal to the rotation rate of the rotor, by means of the angular tilting of these swashplates with respect to the axis of the rotor.

Generally, the swashplates used to control the variation of the pitch of the blades of a rotor of a rotor craft, such as a helicopter, are mounted about the rotor mast and comprise a rotating plate, connected at its periphery by rods to the pitch control levers of the blades of the rotor and driven by the hub or the mast of the rotor, and by means of at least one connecting compass in rotation about the axis of the rotor mast, this rotating plate being mounted in rotation with the aid of at least one ball bearing on a nonrotating plate mounted about the rotor mast and sliding axially along the latter through the action of a collective pitch lever controlled by the pilot, the nonrotating plate also being articulated with respect to the rotor mast with the aid of a universal joint such that the plates may oscillate in every direction about the joint through the action of pilot control rods on the nonrotating plate, this action being controlled from the cyclic control column controlled by the pilot.

The modes of operation and of control of the blades of the main rotors of helicopters give rise to vibrating excitations which are much greater than those observed on transport aircrafts. The main cause of these high vibrating excitations is the main rotor of the helicopters, on which the aerodynamic speeds and variable incidences induced on the blades during their rotation, in particular in forward flight, develop considerable alternating aerodynamic and dynamic stresses which, after transmission to the fuselage of the helicopter by means of the hub, are reflected in high periodic accelerations, above all when the helicopter is moving at high speed. These vibrations are the greater, the greater the load of the rotor (mass, load factor) and the forward speed. These vibrations result mainly in reducing comfort in the helicopter cabin, causing increased fatigue on the part of the crew, particularly during missions of long duration, and in developing high dynamic stresses in the hub and the structure of the helicopter, which causes fatigue in the material and associated equipment.

Regardless of the dynamic optimization of the rotors and structures, the means used hitherto in order to limit these vibration phenomena are essentially passive means of the antivibration or suspension type, disposed at the level of the rotor head, at the level of the connection between rotor and fuselage, and on the fuselage itself. Parallel to the passive means, which appear to have a limited future due to the fact that their mass risks being prohibitive with respect to satisfying increasingly stringent demands for comfort, associated with the increasingly high cruising speeds of modern helicopters, active means for control of the vibrations are also being studied and developed.

As a particular case of these active means for control of the vibrations, it has already been proposed to use a multicyclic control whose principle of action in this application consists in developing alternating stresses which, at the level of the main rotor, counteract the stresses generating vibrations.

With respect to a monocyclic pitch control, conventionally introduced by means of swashplates, a multicyclic (or harmonic) control is a more sophisticated control containing several harmonics of the rotation rate. It has also already been proposed to use such a multicyclic control not only to reduce the stresses or vibration rates, but also to seek to improve the qualities of flight, to push back the limits of the flight enveloppe obtain gains in performance, particularly by controlling stall on the retreating blade or blades of the main rotor in question.

It has also been noted that a multicyclic control of the main rotor of a helicopter, as a system for active control of vibrations, lends itself favorably to integration in an electric flight control system, making it possible to ensure a generalized automatic control of the helicopter.

In a first known embodiment, it has been proposed to introduce the multicyclic control at the level of the control rods of the nonrotating plate of a conventional swashplate device, such that the multicyclic control is simply added to the conventional monocyclic and general control, corresponding to a constant in a fixed reference system, that is to say without taking into consideration the rotation about the axis of the rotor. Such an embodiment retains the conventional monocyclic control system with swashplates and pitch rods, to which are added multicyclic linear actuators, such as electrohydraulic jacks, called "multicyclic" jacks, which are placed in series on the conventional servo-controls, which are mechanically fed, of the longitudinal displacement and of the tilt of the nonrotating plate. Thus, by a judicious choice of the amplitude and of the phase of the commands sent to the three multicyclic jacks, it is therefore possible to counteract the generation of the vibrations at the level of the main rotor.

In contrast to such a superposition, in a fixed reference system, of a conventional monocyclic control and of a multicyclic control, it has already also been proposed to effect the multicyclic control by means of a direct control, in a rotating reference system, with the aid of drive devices which each rotate with a blade whose pitch is controlled.

Among the various embodiments of this type which have been set forth in an article by Mr. Kenneth F. GUINN, entitled "Individual Blade Control Independent of a Swashplate" and published in the July 1982 issue of the "Journal of American Helicopter Society", one comprises, for each blade of the rotor in question, a linear actuator mounted outside the rotor mast and along the upper part of the latter, and articulated, via its upper end, on a coupling rotating with the rotor mast, and via its lower end, on a lever, also rotating with the rotor mast and mounted so as to pivot on the latter about an axis perpendicular to the axis of this mast. This pivoting lever, of which there is one for each blade, is articulated, on the one hand, on the upper end of a lower pitch control rod, whose lower end is driven with the rotating plate of the swashplate device and, on the other hand, on the lower end of an upper pitch control rod, whose upper end drives the pitch control lever of the corresponding blade.

This embodiment in which the multicyclic control is applied in a rotating reference system by linear actuators, which are hydraulic jacks rotating with the rotor about its axis and fed by power supply members also driven in rotation with the rotor mast and accommodated at least partially in the latter, therefore also preserves the conventional monocyclic and general control system with its swashplates and its rods for controlling the tilt and the translation of the nonrotating plate, the multicyclic control being applied in parallel to the monocyclic control on the upper part of this preserved conventional control system.

However, the two embodiments of the state of the art more precisely mentioned above have the drawback that it is necessary to add linear actuators and their power control circuits to a swashplate device, already heavy, bulky and complex on its own, and that it is necessary, moreover, to considerably strengthen the swashplates themselves. This therefore results in an increase in the cost, complexity and weight of such an installation mounted about the rotor mast.

Moreover, the presence of multicyclic jacks and supply conduits projecting about the rotor mast and either above or below the swashplates results in an increase in the aerodynamic drag, either between the swashplates and the underside of the rotor, to a degree which may possibly interfere with the aerodynamic performance of the rotor head, or between the swashplates and the upper part of the fuselage, to a degree which may possibly interfere with the aerodynamic flow at the level of the entry to and/or about the turbine or turbines of the helicopter.

Finally, in the case of the abovementioned embodiment with multicyclic jacks in a rotating reference system, the individual rod system of each blade, consisting of the lower and upper pitch control rods and the lever oscillating on the rotor mast and driven by a corresponding multicyclic jack, is a rod system with an adverse effect not only in terms of drag but also in terms of weight and cost.

Moreover, the articulations of this rod system, stressed by considerable high-frequency alternating stresses, may be subject to wear and consequently introduce play incompatible with a correct operation of the multicyclic control.

The other embodiments presented in the abovementioned paper do not include a conventional control system with swashplates, and some of them consist in elongated arrangements comprising, in series, a linear hydraulic jack, its hydraulic supply means, in module form, with, in particular, a hydraulic pump, its electrical and/or optical control means, in particular with a slip ring, and a rod for driving the pitch control lever of the corresponding blade, these elongated arrangements being disposed axially either inside the rotor mast or outside and along the latter, according to whether it is desired to protect these elongated arrangements from the ambient environment, regardless of the thermal difficulties posed by their operation, or whether it is desired to benefit from the rotating displacement of these elongated arrangements about the rotor mast, in order to obtain a fan effect improving their cooling.

In the first case, which requires a tubular rotor mast of large internal diameter, at least in its lower part, in order to accommodate not only the jacks but also their hydraulic and electrical and/or optical supplies, each pitch control rod, also accommodated in the mast, is articulated via its lower end directly on the rod of the corresponding jack, and via its upper end on a trigger mounted so as to pivot on the upper edge of the rotor mast and driving the pitch control lever of the corresponding blade.

In the second case, the upper end of the rod of each jack is articulated on a lever mounted so as to pivot on the rotor mast and rotating with it, and on which the lower end of the corresponding pitch control rod is also articulated.

As this axial configuration, internal or external to the rotor mast, has not given satisfactory results, another general configuration has also been proposed in the abovementioned paper, and it consists in disposing, on the rotor head, the controls which comprise, for each blade and according to different embodiments, from one to four linear hydraulic jacks fixed according to the span or according to the chord of the corresponding blade, on a radial arm connecting the blade to the hub, and driving one or two pitch control levers, of simple or bent form, either directly or by means of an activating gear each jack being supplied by a hydraulic pump which may be mounted on the central part of the hub and which is itself supplied by a pipe internal to the rotor mast. An alternative version of this configuration is described in the U.S. Pat. No. 4,379,678, and an analysis of this patent and other alternative versions of this configuration which are described in the abovementioned paper leads to the observation that these embodiments are complex, that they pose considerable problems of mounting and alignment, and that they give rise to considerable bulk on the rotor head due to the mounting not only of the electrohydraulic jacks, but also the hydraulic circuits, with their associated piping, pumps, reservoirs, filters and valves, and electrical and/or optical circuits for generating and transmitting control orders at positions on the rotor head where the available space is very limited due to the presence of the members connecting the blades to the hub and other members, such as, for example, drag absorbers.

The aim of the invention is to propose improvements to the individual pitch control devices for the the blades, which are of the type comprising rotating linear jacks, disposed longitudinally outside the rotor mast, such that these improved devices, whilst retaining the advantages of a simpler and less expensive structure than the configurations with control components grouped on the rotor head or hub, or with multicyclic jacks combined with a conventional control system with swashplates, present, moreover, with respect to the known pitch control devices of this type, the advantage of guaranteeing an excellent mechanical behavior of the rotating members of such a device, which are subjected to centrifugal force, and a takeup of the stresses stressing them, without complicating the transmission of hydraulic fluid and/or electrical or optical orders to these members.

The invention therefore aims to propose improved individual control devices for collective, monocyclic and multicyclic pitch in a rotating reference system, which dispense with the conventional monocyclic and general control system with swashplates, whilst remedying the disadvantages of the devices of this type of the state of the art.

The invention also aims to propose such a pitch control device, in which virtually all the stresses, in particular centrifugal stresses, are taken up directly by means of a member which is integrally attached to the rotor mast and available to this end because of its aptitude for suitable sizing with maximum rigidity.

In this field of application, a furhter aim of the invention is to propose such a pitch control device, whose vulnerability, bulk and drag are reduced by the integration of hydraulic components directly in said member integrally attached to the rotor mast.

A still further aim of the invention is to propose such a pitch control device, in which the use of dynamic seals is in practice limited to the hydraulic jacks equipping the device, in order to simplify the production and the maintenance of the hydraulic circuits and to improve the reliability thereof.

To this end, the invention proposes an individual pitch control device for the blades of a rotor of a rotor craft, of the type comprising, for each blade of the rotor, a dual-action electrohydraulic linear jack with at least one body for controlling the collective, monocyclic and, if appropriate, multicyclic pitch in a rotating reference system of said blade, the jack being driven in rotation with the rotor about the axis of the latter and disposed substantially longitudinally with respect to the rotor mast, outside the latter, the control device being defined in that each jack is implanted, via one of two elements formed by its cylinder and its rod, on a rotating support, surrounding the rotor mast and driven in rotation with the rotor about the axis of the latter, whilst the other element of the jack is connected to the pitch control lever of the corresponding blade.

Clearly, the implantation of the jacks in the rotating support results in an improvement of the mechanical behavior of their components subjected to centrifugal force, by taking up the stresses being exerted on each jack directly in the rotating support.

Advantageously, in order to improve this takeup of stresses whilst ensuring good guidance in rotation about the axis of the rotor the rotating support is mounted in rotation, via at least one bearing, about a fixed support, surrounding the rotor mast and integrally attached to the structure of the rotor craft.

In order to facilitate the embodiment of a coaxial mounting of the rotating support and of the fixed support about the rotor mast, without markedly increasing the bulk of the device, in particular around the base of the rotor mast, it is, moreover, advantageous for the fixed support to be a tubular support in which the rotor mast is mounted in rotation about its axis.

The rotating support may be integrally attached to the hub of the rotor in order to be driven in rotation by this hub, however, advantageously, in order to reduce the drag of the rotor head, the rotating support is integrally attached to the rotor mast and driven in rotation by the latter.

In order to further reduce the bulk and therefore the drag of the device, and in order, moreover, to facilitate the hydraulic supply of the rotating jacks, each of the latter is integrated via its cylinder into the rotating support and connected directly via its rod to the corresponding pitch control lever.

The rod of the jack is coupled via its upper end to the pitch control lever by means of a rod with ball joints, but advantageously, the rod of the jack is at least partially tubular and open on the side of its upper end, such that the corresponding pitch control rod may be articulated, at its lower end and by a ball joint, in the tubular rod, so that the connection between the rod and the rod of the jack is located actually inside the jack, in virtually all the relative positions of the cylinder and of the rod of the jack, in order to avoid secondary bending moments in the jacks, each rod being, moreover, articulated, via its upper end, on the corresponding pitch control lever.

In order that the individual pitch control jacks of the blades are themselves each controlled by a closed loop, it is advantageous that the rod of each jack is engaged in or on a sensor of linear displacement of the rod of this jack with respect to its cylinder, this sensor being supported by the rotating support and integrated into said closed loop.

According to an advantageously simple mode of interaction between the rod of a jack and a sensor of linear displacement of this rod, the latter is mounted so as to slide, on the side of its lower end, on a rod fixed to the rotating support and belonging to this linear displacement sensor.

Moreover, according to the invention, each body of each jack is supplied with hydraulic fluid via at least one electrohydraulic control servovalve, also mounted in a rotating reference system and supported by the rotating support. This is advantageous in order to ensure the hydraulic supply of the jacks and, in this configuration in which the servovalves are also components which are subjected to centrifugal force, their mechanical behavior is favorably ensured by the direct takeup of the corresponding stresses by the rotating support. In order to favor this stress takeup, it is advantageous that, moreover, at least one servovalve, but preferably each of them, is integrated in or attached to the rotating support. This, moreover, makes it possible to reduce as much as possible the length of the hydraulic pipes connecting between the servovalves and the jacks which they control. However, moreover, in this case, it is advantageous that the hydraulic pipes are formed at least partially by channels made in the rotating support, which makes it possible to integrate these pipes as much as possible directly in the rotating support, such that it is unnecessary to produce them with the aid of piping attached to the outside of the rotating support and such that, in addition, the aerodynamic drag and the vulnerability, with respect to phenomena external to the device as well as with respect to centrifugal force, are considerably reduced.

Advantageously, moreover, the servovalves are themselves supplied with hydraulic fluid from a least one hydraulic circuit mounted in a fixed reference system on the structure of the rotor craft, by means of at least one hydraulic transfer collector, at least partially accommodated in the rotating support. This makes it possible to further improve the takeup of stresses being exerted on the various components of the device, directly in the rotating support, whilst making it possible to ensure suitable hydraulic supply of the jacks and of the servovalves mounted in a rotating reference system.

Advantageously, for the same reasons as above, at least one hydraulic collector, but preferably each of them, is in communication with at least one servovalve, but preferably each of them which are supplied by each respective collector, via hydraulic pipes formed at least partially, but preferably entirely, by channels made in the rotating support. As above, this measure makes it possible to avoid the mounting of flexible or rigid conduits attached to the rotating support, and reduces the drag of the assembly as well as its vulnerability, by virtue of the integration of the hydraulic supply channels in the rotating support.

According to the invention, it is possible to benefit from the sam advantages at the level of the fixed support, due to the fact that at least one hydraulic collector, but preferably each of them, is in communication with at least one hydraulic circuit of the rotor craft via hydraulic pipes formed at least partially by channels made in this fixed support.

In order to facilitate the attachment to the hydraulic circuits of the rotor craft, it is advantageous that at least one of the pipes, but preferably each of them, connecting a hydraulic collector to at least one of these circuits is connected to a hydraulic unit connecting to these circuits, this hydraulic unit being fixed on the structure of the rotor craft and ensuring the high-pressure supply of the collector and/or the low-pressure return from the latter.

In order to ensure an advantageous integration of the components of the device, in order to reduce the bulk and the vulnerability thereof, at least one hydraulic collector, but preferably each of them, is annular and inserted between the rotating support and the fixed support, in at least one of which it is partially integrated. In an advantageous embodiment for the guiding in rotation of the rotating support on the fixed support and for the disposition of the hydraulic collector or collectors, at least one of the latter, but preferably each of them, is implanted between two bearings spaced axially about the rotor mast, and via which the rotating support is mounted in rotation on the fixed support.

This arrangement lends itself advantageously to the use of hydraulic collectors which are of the type each comprising a rotating joint for transferring of hydraulic fluid under high pressure between two substantially coaxial members, driven in rotation relative to one another, one of which is integrally attached in rotation to the rotating support and the other is integrally attached in rotation to the fixed support. In particular according to the invention, a rotating transfer joint advantageously used is of the type comprising two substantially coaxial annular members of revolution, one of which is in radial contact with the fixed support via two static seals, axially spaced on either side of a distribution groove of revolution made on this member, and opposite a distribution groove made in the fixed support, in which emerges at least one channel internal to the latter and in communication with a high-pressure supply pipe, the other member of the rotating transfer joint being in radial contact with the rotating support, also via two static seals axially spaced on either side of a distribution groove of revolution on this other member, and opposite a distribution groove presented by the rotating support and in which emerges at least one channel internal to the latter for the high-pressure supply of at least one control servovalve of a jack, one of the two members of the rotating transfer joint surrounding, with slight radial play, an axial part of the other member and carrying a ring of revolution projecting axially and radially with respect to the member carrying it and which is engaged with play in a groove of revolution made in the other member and forming, opposite the two members and between the latter, radial and coplanar sealing slits extending on either side of a distribution transfer groove, also of revolution, made in the other member and in communication with the other distribution groove of this other member via at least one channel internal to the latter, whilst the ring is pierced with a transfer channel, emerging at one end, opposite the distribution transfer groove and, at the other end, opposite a channel pierced in the member carrying the ring and in communication with the other distribution groove of this member.

It is thus possible to attain various advantages peculiar to this known type of rotating joint for the transfer of hydraulic fluid between two parts in rotation relative to one another, these advantages consisting, more particularly, in that a transfer joint of this type works in hydraulic friction, ensuring very low friction couples at high rotational speeds and high transfer pressures, in that the coplanar sealing slits may be kept at predetermined values, and therefore the members of the joint may be kept in predetermined positions by a hydrostatic automatic control tolerating a relatively large radial play and a certain lack of alignment or distortion between the rotating support and the fixed support, in that the release of heat from such a transfer joint during operation is relatively small, in that the leakage flows between the two members in relative rotation of the transfer joint are limited, in that the contacts and the seals between the members of the rotating transfer joint and the rotating and fixed supports are ensured solely by static seals, such that the use of dynamic seals is restricted to the jacks of the device, and in that reliability is improved and maintenance facilitated.

Advantageously, moreover, in order to simultaneously facilitate the production of the low-pressure hydraulic return pipe of the control servovalves of the jacks towards the hydraulic circuit or circuits of the rotor craft, and the recirculation of the leakage flows of the hydraulic collector or collectors, at least one of the latter but preferably each of them, comprises an end colleting chamber delimited between the rotating and fixed supports, for the recovery of leakage flows from the corresponding collector and in which emerge, on the one hand, at least one channel internal to the rotating support and in communication with the low-pressure return of at least one servovalve and, on the other hand, at least one channel internal to the fixed support and in communication with a low-pressure return conduit towards at least one hydraulic circuit.

For safety reasons, it is, moreover, advantageous that each jack comprises at least two bodies in tandem, each of which is controlled by one respectively of a corresponding equal number of control servovalves, each of which is itself supplied by one respectively of an equal number of hydraulic collectors, advantageously superposed, and each in communication with one respectively of an equal number of hydraulic circuits of the rotor craft. This makes it possible to ensure a redundancy of the control.

Finally, advantageously, each control servovalve of the jack of each blade of the rotor is itself controlled by orders originating from at least one electrical and/or optical collector mounted at least partially in a rotating reference system in and/or on the rotor mast, the orders being produced from signals supplied by at least one sensor of the angular position of the corresponding blade about its pitch change axis, and/or by at least one sensor of linear displacement of the rod of the corresponding jack with respect to its cylinder.

The invention will be better understood and further advantages and characteristics of the invention will emerge upon reading the description given below, in a nonlimiting manner, of illustrative embodiments described with reference to the appended drawings, in which.

Figure 1:
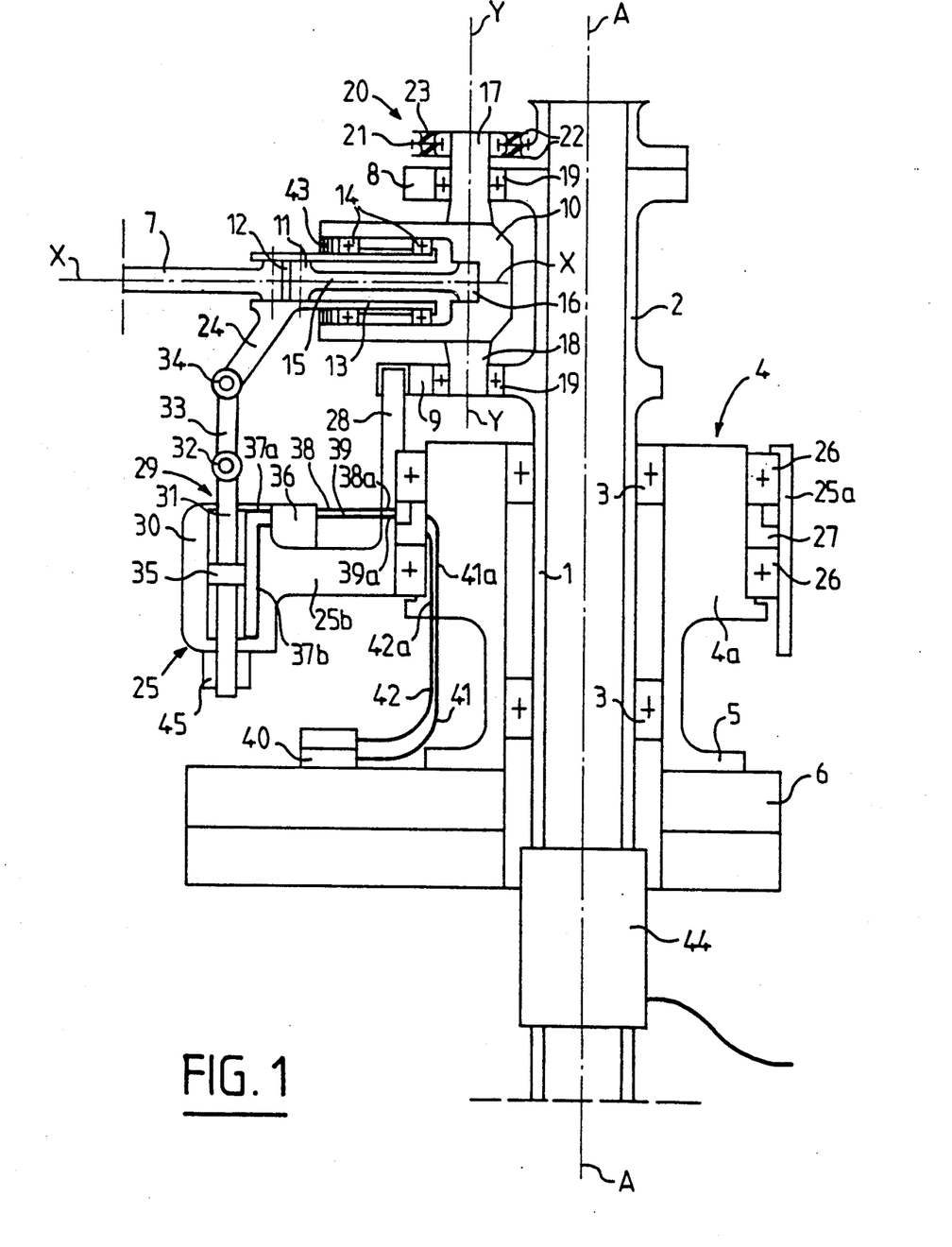
FIG. 1 is a diagrammatic view in axial section of a main rotor head of a helicopter with its rotor mast and equipped with an individual pitch control device according to the invention.

The main rotor of a helicopter shown in FIG. 1 comprises a tubular rotor mast 1 which is integrally attached via its upper end to a hub 2 and mounted in rotation via two bearings 3, offset longitudinally with respect to the axis A of the rotor mast 1, that is to say with respect to the axis of rotation of the rotor, inside a tubular and coaxial guide sleeve 4, fixed by means of an external radial flange 5 of its lower end to the structure 6 of the helicopter on the upper part of the fuselage of the latter.

The rotor mast 1 is integrally attached in rotation, via its lower end, to the output shaft of the main gear box (not shown) of the helicopter, which is also supported by the structure in the upper part of the fuselage such that the rotor mast 1 and the hub 2 are driven in rotation about the axis A above the fuselage of the helicopter.

For each of the blades 7 of the rotor, the hub 2 comprises two upper 8 and lower 9 radial plates which are superposed and spaced axially from one another in order to accommodate between them a sleeve 10 connecting the corresponding blade 7 to the hub 2. The root 11 of each blade 7 is held by two diametral spindles 12, perpendicular to the longitudinal axis of the blade 7, in a cylindrical bush 13 which is mounted coaxially and in rotation about its axis X—X in the radial bore, with respect to the axis A, of the sleeve 10, by virtue of two bearings 14 offset from one another along the axis X—X, and the root 11 of the blade 7 is extended radially towards the axis A by a flexible and twistable arm 15, passing axially through the bush 13 and whose internal radial end 16 is held in the base of the sleeve 10 about an axis coincident with the axis of drag Y—Y, parallel to the axis A of the rotor, and about which the sleeve 10, and therefore also the bush 13 and the blade 7 with its root 11 and its flexible and twistable arm 15, are mounted in rotation in the upper 8 and lower 9 plates by means of upper 17 and lower 18 journals which are integrally attached to the sleeve 10 and engaged in two bearings 19 mounted in these plates 8 and 9.

The angular oscillations of the blade 7 and of its sleeve 10 in drag about the axis Y—Y are absorbed and a resilient return towards an initial position of rest of the blade 7 is ensured by a drag absorber 20 which is, for example, of the type comprising a rigid central metal plate 21 held on the hub 2 and connected via viscoelastic elastomeric layers 23 to each of two rigid external metal plates 22, between which the central plate 21 is inserted, and which are held on the sleeve 10, for example at the level of the upper journal 17.

Each blade 7 is flexible in flapping such that it is futile to provide a flapping articulation at the level of the connection of the sleeve 10 to the hub 2.

Finally, the changes in incidence of each blade 7 by rotation about its pitch change axis, coincident with the axis X—X of the bush 13, are permitted by the rotation of this bush 13 with the blade root 11 in the sleeve 10, and by the torsional deformation of the connection arm 15, which also ensures a return towards an initial position of the blade about its pitch axis X—X. The changes in pitch are introduced on the blade 7 by a pitch control lever 24 integrally attached to the external radial end of the bush 13 and projecting downwards and laterally on this bush 13.

The pitch changes are controlled by a collective monocyclic and multicyclic pitch control device in a rotating reference system which comprises, in addition to the fixed sleeve 4, an annular and rotating support 25, surrounding the fixed sleeve 4, and of which one axial and tubular part 25a is mounted coaxially in rotation about the upper and thickened axial part 4a of the fixed sleeve 4, via two bearings 26 which are axially offset from one another and between which is implanted an annular hydraulic collector 27, thus inserted between the fixed 4 and rotating 25 supports, and whose function will be described hereinafter.

The rotating support 25 is driven in rotation by the lower plate 9 of the hub 2, to which its axial part 25a is rigidly connected via axial fingers 28 which extend it, and the upper end of each of which is directly anchored in the periphery of the lower plate 9. For each blade 7, the rotating support 25 has a radial arm 25b, in the external radial end of which is directly implanted the cylinder 30 of a servocontrol jack 29 whose rod 31 is articulated, via a ball joint at its upper end, on the lower end of a rod 33 which is itself articulated via a ball joint 34, at its upper end, on the free end of the pitch control lever 24 of the corresponding blade.

This jack 29 is a dual-action, electrohydraulic linear jack, with a single body to simplify the description, whose rod 31 carries a piston 35 mounted so as to slide in a leakproof manner in a bore directly made in the external radial part 30 of the corresponding arm 25b of the rotating support 25, which forms the cylinder of the jack integrated into this support 25, such that the piston 35 defines, in the bore of the cylinder 30 which accommodates it, the two working chambers of the jack, whose volumes vary in opposite directions. Each of these jacks 29, in a number equal to the blades 7 of the rotor, is supplied with high-pressure hydraulic fluid by a control servovalve 36 which is directly coupled and fixed to the corresponding arm 25b of the rotating support 25 and to the cylinder 30 and rotates with them, and which is in communication with each of the two working chambers of the jack 29 via one respectively of two hydraulic pipes 37a and 37b formed by channels pierced directly in the part of the rotating support 25 forming the cylinder 30 of the corresponding jack 29.

The servovalve 36 is itself connected to the part rotating with the rotating support 25 of a rotating joint for transferring hydraulic fluid, that the hydraulic collector 27 includes, via a rotating high-pressure hydraulic supply conduit 38 and a low-pressure rotating hydraulic return conduit 39, part of each one of which is formed by a channel 38a or 39a directly pierced in the rotating support 25.

In a similar manner, the part of the rotating transfer joint of the hydraulic collector 27 which is nonrotating with the fixed support 4 is connected to a hydraulic unit 40, fixed on the structure 6, via a high-pressure nonrotating supply conduit 41 and a low-pressure nonrotating return conduit 42, a part of each of which is formed by a channel 41a or 42a directly pierced in the fixed support 4.

The parts of the hydraulic conduits 38, 39, 41 and 42 which are not formed by the channels pierced in either of the rotating 25 and fixed 4 supports consist of flexible or rigid piping.

The hydraulic unit 40 comprises a high-pressure hydraulic supply stage and a low-pressure hydraulic fluid return stage which are respectively connected, on the one hand, to the conduits 41 and 42 and, on the other hand, to either a main hydraulic power circuit or a backup hydraulic circuit (not shown) mounted in a fixed reference system on the structure of the helicopter, by means of an automatic switching valve, also accommodated in the unit 40 and thus ensuring, in a fixed reference system, the coupling between these two hydraulic circuits.

Thus, each of the electrohydraulic servocontrol jacks 29, mounted in a rotating reference system, is controlled by a servovalve 36 which is itself mounted in a rotating reference system and supplied with hydraulic fluid from the hydraulic unit 40, in a fixed reference system, by means of the hydraulic collector 27 implanted between the rotating 25 and fixed 4 supports.

The angular position of each blade 7 about its pitch change axis X—X is defined by a closed loop comprising angular position sensors 43, for example of known inductive types, uniformly distributed in a circumferential direction inside the external radial end of the sleeve 10 and between the latter and the bush 13 integrally attached to the blade root 11, of which the sensors 43 thus detect the angular position about its axis X—X with respect to the sleeve 10. These sensors 43 supply output signals giving the angular position in pitch of each blade.

These signals are transmitted optically and/or electrically and by a collector 44 mounted in the base of the rotor mast 1 to computers (not shown) on board the helicopter and which produce control orders from the displacements of the flight controls by the pilot or from the automatic pilot orders. These control orders are transmitted electrically and/or optically through the collector 44 towards each of the servovalves 36 which themselves each control an electrohydraulic jack 29.

In this manner, each rotating jack 29 makes it possible to introduce, on the pitch control lever 24 of the corresponding blade 7, a collective pitch and monocyclic pitch control ensured in a rotating reference system. This control may be supplemented, still in a rotating reference system, by a multicyclic control via the same hydraulic jacks 29.

The multicyclic control orders are produced by onboard computers from algorithms introduced into these computers. These orders are transmitted electrically and/or optically towards each of the servovalves 36 through the collector 44 in order to ensure the corresponding control of the jacks 29 in order to drive the levers 24 which rotate the blades about their pitch axis X—X.

The return of information from the automatic control loop is performed from angular sensors 43 located on the blade sleeve and, possibly, moreover, by a sensor 45 of linear displacement of the rod 31 of each jack 29 with respect to the corresponding cylinder 30, each sensor 45 being mounted under the cylinder 30 and axially traversed by the lower end part of the corresponding rod 31. The electrical and/or optical indications of the angular sensors 43, and, if appropriate, of the linear sensors 45 are transmitted to the onboard computers by means of the collector 44.

For safety reasons, the sensors of rotation of a blade 7 are duplicated or triplicated and connected to computers which are themselves duplicated or triplicated in order to each control one of the duplicated or triplicated torque motors of the electrical control stage of the corresponding servovalve 36.

Similarly, for safety reasons, each of the servocontrol jacks 29 may be a dual-body jack, each body of which is controlled by one respectively of two servovalves such as 36, each supplied by one respectively of two superposed hydraulic collectors, such as 27, implanted between the rotating 25 and fixed 4 supports and themselves supplied in parallel from the hydraulic circuit or circuits of the helicopter. In an alternative version, the electrical and/or optical collector for transferring control orders from the onboard computers, in a fixed reference system on the helicopter, to the servovalves 36 in a rotating reference system, and the output signals from the detectors 43 and 45, in a rotating reference system, to the onboard computers, may be mounted above the rotor mast 1 on the hub 2.

Figure 2:
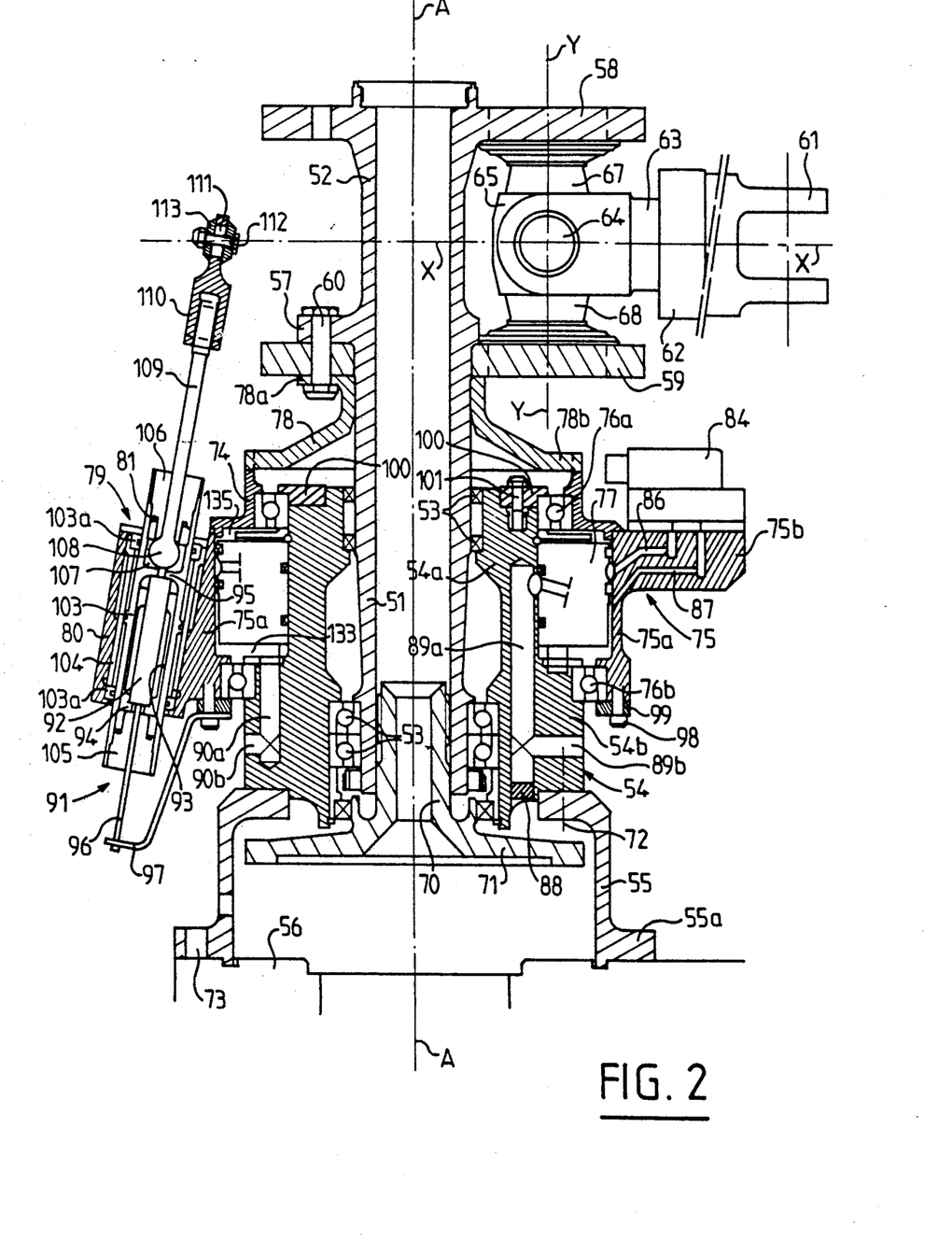
FIG. 2 is a view in axial section of another example of the device according to the invention, mounted in a similar manner about the mast of a main rotor of a helicopter, with the assistance of a rotating support.

On the pitch control device in FIG. 2, there is a fixed, tubular, guide sleeve 54 in which a rotor mast 51, integrally attached to a rotor hub 52 at its upper end, is mounted in rotation about the axis of rotation A of the rotor via two axially spaced pairs of bearings 53. The rotor mast 51 is driven in rotation by internal longitudinal splines in its lower end part, engaging with external longitudinal splines on a drive shaft 70, fitted into the base of the rotor mast 51 and equipped with an external radial flange 71, by means of which this drive shaft 70 is coupled to the output shaft (not shown) of the main gear box to the inside of a hollow seat connecting to the structure 56 of the helicopter and formed from an annular casing 55, on which the fixed sleeve 54 is held by a ring of bolts extending along axes parallel to the axis 72.

This casing 55 is fixed on the structure 56 by means of another ring of bolts (not shown), each of which passes through an orifice such as 73 pierced in an external support and embedding radial flange 55a on the structure 56.

It is also found that the hub 52 comprises an upper radial plate 58 which is made in a single piece with the central tubular part of the hub 52, itself made in a single piece with the rotor mast 51 and in the extension of the latter. However, the lower radial plate 59 of the hub 52 is annular and attached by engagement about the rotor mast 51 so as to be held against an external radial flange 57 of the mast 51 via bolt connections such as 60. Each blade (not shown) is held via its root in an external radial yoke 61 of a bearing mounted so as to swivel about the pitch change axis X—X of the blade in an external radial end bush 62 of a sleeve 63 connecting the blade to the hub 52, this sleeve 63 itself being mounted so as to oscillate via the pivot 64 about the flapping axis, perpendicular to the axis X—X and extending in the plane of rotation of the rotor, on a core 65. This core 65 is itself mounted so as to swivel via upper 67 and lower 68 journals in the respective upper 58 and lower 59 plates of the hub 52, about the drag axis Y—Y of the blade.

There is also a rotating support 75 mounted coaxially in rotation on the fixed sleeve 54 via two bearings 76a and 76b offset axially from one another and between which a hydraulic collector 77 is implanted between the rotating support 75 and the fixed support 54 in order to supply the servovalves, such as 84 integrally attached to the rotating support 75, therefore mounted in a rotating reference system, and each of which controls one of several multicyclic jacks 79 in a number equal to the number of blades of the rotor and implanted in the rotating support 75. The upper bearing 76a is mounted between the upper end of the tubular axial part 54a of the fixed support 54 and an annular cover 74 closing the upper end of a tubular axial part 75a of the rotating support 75, by means of a shouldered annular spacer 100 and a screw ring 101 screwed into the fixed support 54, whilst the lower bearing 76b is mounted between an internal radial edge of the lower end of the tubular axial part 75a of the rotating support 75 and the thickened lower end part 54b, projecting radially outwards, of the fixed sleeve 54. In this manner, the annular hydraulic collector 77 is accommodated in the fixed 54 and rotating 75 supports and partly enclosed in the fixed sleeve 54 and partly in the rotating support 75. The axial part 75a of the latter carries, projecting radially outwards, on the one hand, for each of the servovalves 84, a support unit 75b and, on the other hand, for each of the servocontrol jacks 79, that is to say for each of the blades (not shown) of the rotor, a unit 80 made as a cylinder for the corresponding jack 79.

The drive of the rotating support 75 in rotation about the axis A, with the rotor mast 51 and the hub 52, is ensured via a drive sleeve 78, of generally frustoconical form, whose small base, in the form of a cylindrical collar surrounds the rotor mast 51 just below the lower plate 59 of the hub 52, applying it against the radial flange 57 of the mast 51, and has external radial lugs, such as 78a, each integrally attached to the lower plate 59 and to the flange 57 via a bolt connection 60 fixing the lower plate 59 to the mast 51. At its large base, the drive sleeve 78 has an external radial flange 78b equipped at the periphery of its lower face with radial splines and covering the cover 74, in order to hold it in position and drive it in rotation about the axis A—A via corresponding radial splines made on the top of said cover 74.

In this example also, each jack 79 is a dual-action electrohydraulic linear jack, whose cylinder 80 is thus directly integrated into the rotating support 75 and whose rod 81 carries an annular piston 103, projecting externally radially, sliding in a leakproof manner in a sleeve 104 mounted in the cylinder 80 and between two dynamic seals 103a closing the opposite working chambers of the jack 79. In this example, the rod 81 of the jack is tubular and its internal volume is subdivided into a large lower chamber 105 opening downwards at its lower end, projecting beneath the cylinder 80, and a small upper chamber 106 opening upwards at its upper end, also projecting, but above the cylinder 80 and accommodating a concave spherical seating 107 in which is held a ball pivot 108 of the lower end of a pitch control rod 109, of adjustable length, whose upper end is screwed into a rod end 110 with a ball joint 111 coupled via an axis 112 into an end yoke 113 of a pitch control lever (not shown) of the corresponding blade. As the two working chambers of the jack 79 are delimited by the piston 103, the two joints 103a and the sleeve 104 in a cylinder 80 which is an integral part of the annular casing 75a of the rotating support 75, on which the corresponding control servovalve 84 is directly connected, the hydraulic connection between these two chambers of the jack 79 and the servovalve 84 is ensured by hydraulic pipes entirely formed by channels pierced in the cylinder 80, the annular casing 75a and in the support unit 75b carrying the corresponding servovalve 84. Similarly, the servovalve 84 is connected to the hydraulic collector 77 by hydraulic pipes formed entirely by channels 86 and 87 pierced in this same annular casing 75a and in the corresponding support unit 75b. These channels 86 and 87 are shown in FIG. 2 and partially in FIG. 3, with reference to which a description is presently given of the structure of the hydraulic collector 77 and in which there is also shown a channel 89a pierced in the fixed support 54 in order to supply the hydraulic collector 77 with high-pressure hydraulic fluid, the high-pressure hydraulic supply pipes 86, 89a, 89b and low-pressure return pipes 87, 90a, 90b being more completely shown in FIG. 2.

Figure 3:
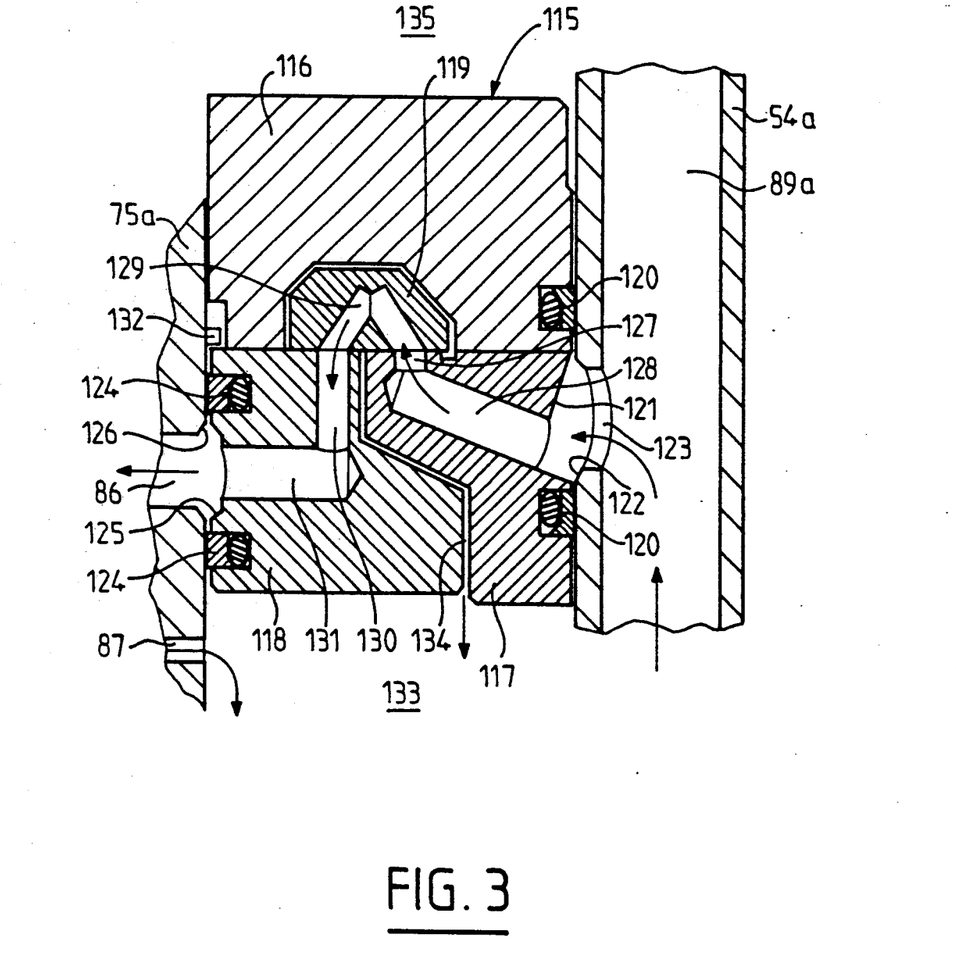
FIG. 3 is a partial and diagrammatic diametral section of the hydraulic collector of the device in FIG. 2.

In fact, the hydraulic collector 77 used is of the type comprising a rotating joint for transferring hydraulic fluid under high pressure between two parts mounted one in the other and in relative rotation at high speed, this rotating transfer joint being, for example, of the type marketed under the name "Rotostat" by the company Glyco Industrie Automation, which joints are rotating joints with a large flow essentially transmitting a static pressure between an annular casing and an internal tubular member and which are driven in relative rotation with respect to one another, with a low leakage flow and with low friction couples.

A diametral half section of a rotating transfer joint of this type, implanted between the annular casing 75a of the rotating support 75 and the axial tubular part 54a of the fixed support 54, is diagrammatically shown in FIG. 3. This rotating transfer joint 115 essentially comprises four annular members 116, 117, 118 and 119, of revolution about a common axis which is the axis A of the rotor, and such that the members 116 and 117 respectively in an upper axial position between the parts 54a and 75a of the two supports 54 and 75 and in an internal radial lower axial position about the part 54a of the fixed sleeve 54, are assembled together by means of screws (not shown), and on the part 54a of the fixed support 54, against which they are applied via two static seals 120, spaced axially on either side of an internal radial groove of revolution 121 machined in the member 117 and opposite a groove of revolution 122 machined in the external radial face of the part 54a and in communication via an orifice 123 pierced in this part 54a with a longitudinal channel 89a also pierced in this part of support 54a, for the hydraulic supply under high pressure. The two other main members of the joint 115 are a member 118 in an external radial lower axial position, which, with radial play, surrounds the member 117 connected to the fixed support 54, and a ring 119 which is assembled via screws (not shown) to the member 118 and is accommodated, with radial and axial play, in a groove made in the lower radial face of the member 116, such that the ring 119 projects axially above the member 118 which carries it and projects radially inwards with respect to this member 118, and such that it extends above an external radial part of the upper face of the member 117. Moreover, the ring 119 and the member 118 which carries it are assembled to the annular casing 75a of the rotating support 75, against which the member 118 is applied via two static seals 124 which are axially spaced on either side of an external radial groove of revolution 125 machined in the member 118 opposite the groove of revolution 126 machined in the internal radial face of the annular casing 75a of the rotating suport 75 and into which emerge channels 86 pierced in this casing 75a and in the support units 75b and each of which ensures the high-pressure hydraulic supply of a servovalve 84 controlling a jack 79.

The ring 119 is connected, with slight axial play determined by a thin spacer, to the member 118, such that slits located in the same radial plane are delimited between, on the one hand, the ring 119 and the upper member 116 and, on the other hand, the two lower members 117 and 118, these coplanar slits extending radially inside and outside of a machined distribution groove of revolution 127 in the external radial part of the member 117, opposite the ring 119 and in communication, via a channel 128 pierced in the member 117, with the internal radial groove 121 of this member 117. Opposite the groove 127 emerges one end of a bent channel 129, pierced in the ring 119, whose other end emerges opposite a channel 130 pierced axially in the member 118 and in communication, via a radial channel 131, also pierced in this member 118, with the external radial groove 125 presented by this member 118.

The hydraulic fluid under pressure arrives in the annular part 54a of the fixed support 54 via the channel 89a internal to this support and flows, via the orifice 23 and the groove 122, into the groove 121, from which the fluid flows, via the channel 128, to the distribution groove 127 of the member 117. The fluid under pressure is transferred from this distribution groove 127 into the channel 129 of the ring 119, then into the channels 130 and 131 of the member 118 to the groove 125 of the latter, from which the fluid flows into the groove 126 of the annular casing 75a of the rotating support 75, and from this groove, via the channels 86 internal to this casing 75a, to the servovalves 84. As the distribution groove 127 emerges into the plane of the abovementioned coplanar slits, a differential pressure is established in these slits, which delimit two opposite surfaces of different values on the ring 119 and the opposite members 117 and 118, and a flow of hydraulic fluid at this differential pressure circulates about the ring 119, between the latter and the walls and the base of the groove accommodating it. On the one hand, the high pressure prevailing in the distribution groove 127 and, on the other hand, the differential pressure created by the coplanar slits are exerted on the opposite surfaces delimited by these coplanar slits, such that, in an equilibrium state of the joint, these two pressures create two opposite forces of equal value. Any external force which tends to cause a relative displacement of the part of the joint 116, 117 which is in contact with the fixed support 54 and of the part of the joint 118, 119 which is in contact with the rotating support 75 involves a variation in the value of the coplanar slits, therefore a variation in the differential pressure being established in these slits, such that the resultant of the forces being exerted on the two parts of the joint tend to bring these two parts into a position of equilibrium. The result of this is a hydrostatic automatic control maintaining the coplanar slits at a predetermined value and tolerating a relatively large radial play as well as a certain lack of alignment or deformation of the rotating support with respect to the fixed support. The axial positioning of the joint 115 is ensured by the application of the upper face of the member 118, integral in rotation with the rotating support 75, against a plane stop surface of the rotating support 75, projecting radially inwards towards the fixed support 54, and such as defined, for example, via the radial shoulder 132 in FIG. 3, this engagement being ensured by at least one resilient member such as a spring washer (not shown) stressing the member 118 at the level of its lower face.

The low-pressure return pipe of each servovalve 84 towards the hydraulic collector 77 is formed by a channel 87 pierced in the corresponding support unit 75b and in the annular casing 87a of the rotating support 75 and emerging in a low-pressure collecting chamber 133 made in the hydraulic collector 77, below the rotating transfer joint 115 and above the lower bearing 76b, and between the parts 54a and 75a of the fixed 54 and rotating 75 supports. This low-pressure collecting chamber 133, partially shown in FIG. 3, also collects the leakage flow flowing via the radial play 134 between the two members 117 and 118 in a lower position of the joint 115. It should also be noted that the hydraulic fluid flowing between the upper member 116 of this joint 115 and the annular casing 75a is collected in the upper chamber 135 (see FIGS. 2 and 3) of the hydraulic collector 77, above the joint 115 and under the upper bearing 76a, this chamber 135, in an upper position, itself being connected to the low-pressure collecting chamber 133, in a lower position, via at least one channel (not shown) pierced in the part 54a of the fixed support 54.

The rotating transfer joints of this type, which are known and patented in the name of Cyphelly, are joints working in hydraulic friction and counteracting only low friction couples, even when they operate at high pressure and high rotational speed.

The return of the hydraulic fluid from the low-pressure collecting chamber 133 of the collector 77 towards the hydraulic circuit or circuits of the helicopter is ensured by a return pipe formed by channels internal to the fixed support 54 and by a flexible conduit, in the manner described hereinafter.

These return channels, internal to the fixed support 54 are shown in FIG. 2, and comprise the axial channel 90a, pierced in the external radial portion of the thickened base 54b of the fixed support 54 and emerging upwards in the low-pressure return chamber 133 of the hydraulic collector 77, and downwards in a radial channel 90b, pierced in the same external radial portion of the base 54b of the support 54 and itself emerging outside the fixed support 54.

A joining element for leakproof connection to flexible piping, which does not rotate and has a large diameter in order to ensure satisfactory pressure reduction of the returning hydraulic fluid, is connected in a leakproof and removable manner in the channel 90b, and the other end of the flexible piping is connected on the return of the hydraulic circuit or circuits of the helicopter by means of the abovementioned hydraulic unit (not shown) fixed on the structure of the helicopter.

In order to supply the hydraulic collector 77, the high-pressure hydraulic fluid supply in the channel 89a, internal to the axial part 54a and to the base 54b of the fixed support 54, is ensured via a radial channel 89b internal to the base 54b of the fixed support 54, and emerging, on one side, outside the latter and, on the other side, in the axial channel 89a, above a closing stopper 88 of the lower end of this channel 89a.

A joining element connecting in a leakproof manner to flexible and nonrotating piping is connected in a leakproof manner in the channel 89b and the other end of the piping is connected to the high-pressure supply of the hydraulic circuit or circuits of the helicopter by means of the abovementioned hydraulic unit fixed on the structure.

In this example, it is observed that almost all the stresses being exerted on the various components of the pitch control device, and especially centrifugal forces, are directly taken up by the casing of the rotating support 75. The use of dynamic seals is essentially restricted to the multicyclic and servocontrol jacks 79 due to the fact that the hydraulic collector 77 comprises a rotating transfer joint 115 solely equipped with static seals. The integration in the fixed 54 and rotating 75 supports of the cylinders 80 of the jacks 79, of the channels connecting them to the control servovalves 84, of the channels 86 and 87 connecting the latter to the hydraulic collector 77 and of the channels 89a, 98b, 90a, 90b connecting the latter to the hydraulic circuits of the helicopter reduces the bulk of the device and the overall aerodynamic drag, whilst improving the protection of these essential components of the device.

It should be noted that the device according to the invention makes it possible to replace a conventional pitch control device, without multicyclic control, by a configuration with multicyclic control but without conventional swashplates. The device according to the invention therefore makes it possible to reequip existing helicopters. Moreover, the assembly of the jacks 79, the control servovalves 84 and the hydraulic collector 77, integrated into the fixed 54 and rotating 75 supports comprises no additional connecting element, which is a guarantee of reliability. Moreover, the mechanical elements of the hub which are greatly stressed during operation, such as the pitch control rods and the sleeves connecting the blades to the hub, do not support any additional mechanical element due to the multicyclic control.

In the example of FIG. 2, as in that of FIG. 1, the electrical control of the servovalves 84 is transmitted via an electrical and/or optical collector (not shown) belonging to a closed loop, which is installed partially in a rotating reference system and also comprises sensors of the angular position of the blades about their pitch axis as well as sensors of the linear path of the rods of the jacks.

In the example of FIG. 2, each sensor 91 of the linear path of the rod 81 of a jack 79 with respect to the corresponding cylinder 80 is also of a well-known inductive type comprising a cylindrical bush 92, accommodated in the large lower chamber 105 of the tubular rod 81 of the jack, in which it is held via a sleeve 93. On mounting, the bush 92 of the sensor is first introduced axially into the sleeve 93 until it comes up against, via one end, an internal radial shoulder 94 of this sleeve 93. Then, the assembly of the bush 92 and of the sleeve 93 is introduced axially into the chamber 105 of the jack rod 81 until the other end of the bush 92 comes up against a transverse partition 95, internal to the rod 81 and separating the two chambers 105 and 106 of the latter from one another. The sleeve 93 is held in the chamber 105, for example, via screwing of an external thread of this sleeve in an internal thread of the chamber 105. Thus, the bush 92 and its sleeve 93 are integrally attached to the jack rod 81 in its axial displacements with respect to the cylinder 80. The sensor 91 also comprises a rod 96 which is slim, elongated and straight, engaged axially in the bush 92, and the lower end of which is integrally attached to the lower end of a rigid S-shaped support 97, fixed via its upper end and via one of a set of bolts 98 against a ring 99 held by the bolts 98 against the lower face of the part 75a of the rotating support 75 so as to axially retain the external track of the lower bearing 76b.

Thus, the rod 96 rotates with the rotating support 75 but remains fixed with respect to the corresponding cylinder 80, and the bush 92 of the sensor 91 slides with the jack rod 81 on the rod 96 of the sensor 91 such that the instantaneous axial position of the bush 92, and therefore of the jack rod 81, with respect to the rod 96, and therefore with respect to the cylinder 80, is detected.

In the two embodiments described above, the rotating linear jacks, which constitute the drive members of the controls of the collective pitch, the monocyclic pitch and of the multicyclic pitch, are implanted in the periphery of a rotating, but not oscillating and not sliding, support which forms a sufficiently large rotating seat to receive these jacks and recover virtually all the stresses to which they are subjected. Similarly, this rotating support ensures the takeup of forces, particularly centrifugal forces, which are exerted on the servovalves as well as on the rotating part of the hydraulic collector or collectors, since these members are also mounted in a rotating reference system on this support. Moreover, in the embodiment of FIG. 2, the position of the pivot 108 connecting to the rod 109, substantially inside the jack 79, due to the fact that this pivot 108 is fixed directly in the tubular rod 81 of the jack, makes it possible to avoid the application of secondary bending moments in the jack. Finally, in the embodiment of FIG. 2, as in that of FIG. 1, it may be necessary, for safety reasons, for each jack 79 to be a jack with a dual-body in tandem, each body being supplied by one respectively of two servovalves associated with the jack, each servovalve itself being supplied by one respectively of two independent hydraulic collectors which are themselves connected, in an independent manner, to a double hydraulic circuit of the helicopter.

The alternative versions, described above, of the individual control device of the pitch of the blades according to the invention present a considerable technological simplification with respect to the control devices of monocyclic pitch in a fixed reference system and multicyclic pitch in a rotating reference system which comprise a conventional control system with swashplates for the control of and monocyclic pitch, and to which have been added multicyclic jacks, whilst retaining the functional advantages of such a known solution.

When a multicyclic control is added to a collective and monocyclic pitch control and applied to each blade by a direct and individual control jack for the pitch of this blade, the devices according to the invention make it possible to seek maximization of lift with equal power and/or minimization of power with equal lift. They also make it possible to seek a better distribution of the lift developed on a blade during its rotation about the axis of the rotor, which can lead to a virtual elimination of the stall zones of the blades.

Generally, these pitch control devices ensure gains in performance at high loads and/or at high speeds, and ensure considerable reductions in levels of vibrations.

We claim:

1. An individual pitch control device for the blades (7) of a rotor of a rotor craft, said rotor having a plurality of independently controlled blades, comprising, for each blade (7) of the rotor, a respective dual-action, electrohydraulic linear jack (29) with at least one body, controlling the collective, monocyclic and, if appropriate, multicyclic pitch in a rotating reference system of said blade, said jack (29) being driven in rotation with the rotor about an axis (A) thereof and disposed substantially longitudinally with respect to a rotor mast (1), and outside said rotor mast, wherein each jack (29) is implanted, via one of two elements formed by a respective cylinder (30) and rod (31), on a rotating support (25) surrounding the rotor mast (1) and driven in rotation with the rotor about the axis (A) thereof, whilst the other of said two elements of the jack (29) is connected to a pitch control lever (24) of the corresponding blade.

2. The pitch control device as claimed in claim 1, wherein said rotating support (25) is mounted in rotation, via at least one bearing (26), about a fixed support (4), surrounding the rotor mast (1) and integrally attached to the structure (6) of the rotor craft.

3. The pitch control device as claimed in claim 2, wherein said fixed support (4) is a tubular support in which said rotor mast (1) is mounted in rotation (3) about its axis (A).

4. The pitch control device as claimed in claim 1 wherein said rotating support (25) is integrally attached to the hub (2) of the rotor and driven in rotation by said hub (2).

5. The pitch control device as claimed in claim 1 wherein said rotating support (75) is integrally attached to the rotor mast (51) and driven in rotation by said rotor mast.

6. The pitch control device as claimed in claim 1, wherein each jack (29) is integrated via its respective cylinder (30) into said rotating support (25) and connected via its respective rod (31) to said corresponding pitch control lever.

7. The pitch control device as claimed in claim 6, wherein the rod (31) of the jack (29) is coupled by means of another rod (33) to the corresponding pitch control lever (24).

8. The pitch control device as claimed in claim 6, wherein the rod (81) of the jack (79) is at least partially tubular and open on the side of its upper end, and wherein a pitch control rod (109) is articulated, at its lower end and by means of a pivot (108), in the tubular rod (81), and via its upper end (111) on the corresponding pitch control lever (113).

9. The pitch control device as claimed in claim 6, wherein the rod (31) of the jack (29) is engaged in or on a means sensor (43) for sensing a linear displacement of said rod (31) with respect to said cylinder (30), said sensor means (43) being supported by said rotating support (25).

10. The pitch control device as claimed in claim 9, wherein, the rod (81) of the jack (79) is mounted on a side of a lower end thereof so as to slide on another rod (96) fixed to the rotating support (75) and having to a sensor means (91) of linear displacement of the rod (81) for sensing the jack (89) with respect to the corresponding cylinder (80).

11. The pitch control device as claimed in claim 1, wherein each body of each jack (29) is supplied with hydraulic fluid via at least one electrohydraulic control servovalve (36), also mounted in a rotating reference system and supported by said rotating support (25).

12. The pitch control device as claimed in claim 11, wherein at least one servovalve (36) is integrated in or attached on said rotating support (25).

13. The pitch control device as claimed in claim 11, wherein at least one servovalve (36) is connected to the jack (29) which it controls by hydraulic pipes (37a, 37b) formed at least partially by channels made in said rotating support (25).

14. The pitch control device as claimed in claim 11, wherein the servovalves (36) are supplied with hydraulic fluid from at least on hydraulic circuit mounted in a fixed reference system on the structure (6) of the rotor craft by means of at least one hydraulic transfer collector (27), at least partially accommodated in said rotating support (25).

15. The pitch control device as claimed in claim 14, wherein at least one hydraulic collector (27) is in communication with at least one servovalve (36) via hydraulic pipes (38, 39) formed at least partially by channels (38a, 39a) made in said rotating support (25).

16. The pitch control device as claimed in claim 14, wherein at least one hydraulic collector (27) is in communication with at least one hydraulic circuit of the rotor craft via hydraulic pipes (41, 42) formed at least partially by channels (41a, 42a) made in said fixed support (4).

17. The pitch control device as claimed in claim 16, wherein at least one of said pipes (41, 42) connecting a hydraulic collector (27) to at least one hydraulic circuit of the rotor craft is connected to a hydraulic unit (40)

connected to said hydraulic circuit, said unit (40) being fixed on the structure (6) of the rotor craft and ensuring a high-pressure supply to said collector (27) and/or the low-pressure return from said collector.

18. The pitch control device as claimed in claim 14, wherein said at least one hydraulic collector (27) is annular and inserted between said rotating support (25) and said fixed support (4), said annular hydraulic collector being partially integrated in at least one of said rotating support and said fixed support.

19. The pitch control device as claimed in claim 18, wherein said at least one hydraulic collector (27) is implanted between two bearings (26) spaced axially about the rotor mast (1), and via which said rotating support (25) is mounted in rotation on said fixed support (4).

20. The pitch control device as claimed in claim 14, wherein said at least one hydraulic collector (77) comprises a rotating joint (115) for transferring hydraulic fluid under high pressure between two substantially coaxial members (54a, 75a), driven in relative rotation one inside the other one (75a) of said coaxial members being integrally attached in rotation to the rotating support (75) and the other (54a) of said coaxial members being integrally attached in rotation to the fixed support (54).

21. The pitch control device as claimed in claim 20, wherein said rotating transfer joint (115) comprises two substantially coaxial annular members of revolution (116-117, 118), one (116-117) of said annular members being in radial contact with the fixed support via two static seals (120), axially spaced on either side of a distribution groove (121) of revolution formed in said one annular member, and opposite a distribution groove (122) formed in said fixed support (54), wherein at least one channel (89a) internal to the fixed support is in communication with a high-pressure supply pipe (89b), the other of said annular members (118) being in radial contact with the rotating support (75), also via two static seals (124) axially spaced on either side of a distribution groove (125) of revolution formed in said other member (118), and opposite a distribution groove (126) formed in said rotating support (75), wherein at least one channel (86) internal to the rotating support provides a high-pressure supply to at least one control servovalve (84) of a jack (79), said other (118) annular member surrounding, with a slight radial play (134), an axial part (117) of said one member and carrying thereon a ring of revolution (119) projecting axially and radially with respect to said other member (118) and which is engaged with play in a groove of revolution made in said one member (116-117) and forming, opposite and between the annular members, radial and coplanar sealing slits extending on either side of a distribution transfer groove of revolution (127) made in said one member (116-117) and in communication with the distribution groove (121) of said one member (116-117) via at least one channel (128) internal to said one member, wherein said ring (119) is pierced with a transfer channel (129), emerging at one end thereof opposite said distribution transfer groove (127) and, at the other end thereof, opposite a channel (130-131) pierced in said other member (118) and in communication with the distribution groove (125) of said other member (118).

22. The pitch control device as claimed in claim 14, wherein at least one hydraulic collector (77) comprises an end collecting chamber (133) delimited between said fixed (54) and rotating (75) supports, for the recovery of leakage flow from the collector (77), said collecting chamber being in communication with, on the one hand, at least one channel (87) internal to the rotating support (75) and in communication with the low-pressure return of at least one servovalve (84) and, on the other hand, at least one channel (90a) internal to the fixed support (54) and in communication with a low-pressure return conduit (90b) connected to at least one hydraulic circuit.

23. The pitch control device as claimed in claim 1, wherein each jack (29) comprises at least two bodies in tandem, each of which is respectively, by one of an equal number of corresponding control servovalves (36), each of which is supplied, respectively, by one of an equal number of superposed hydraulic collectors (27), each in communication, respectively, with one of an equal number of hydraulic circuits of the rotor craft.

24. The pitch control device as claimed in claim 1, wherein each control servovalve (36) of the jack (29) of each blade (7) of the rotor is itself controlled by orders originating from at least one electrical and/or optical collector (44) mounted at least partially in a rotating reference system in and/or on the rotor mast (1) and produced from signals supplied by at least one sensor means (43) for sensing the angular position of the corresponding blade (7) about its pitch change axis (X-X) and/or by at least one sensor means (45) for sensing a linear displacement of the rod (31) of the corresponding jack (29) with respect to its cylinder (30).

25. An individual pitch control device for the blades (7) of a rotor of a rotor craft, said rotor having a plurality of independently controlled blades, comprising, for each blade (7) of the rotor, a respective dual-action, electrohydraulic linear jack (29) with at least one body, for controlling the collective, monocyclic and, if appropriate, multicyclic pitch in a rotating reference system of said blade, said jack (29) being driven in rotation with the rotor about an axis (A) thereof and disposed substantially longitudinally with respect to a rotor mast (1), and outside said rotor mast, wherein each jack (29) is implanted, via one of two elements formed by a respective cylinder (30) and rod (31), on a rotating support (25) surrounding the rotor mast (1) and driven in rotation with the rotor about the axis (A) thereof, whilst the other of said two elements of the jack (29) is connected to a pitch control lever (24) of the corresponding blade, further comprising at least one hydraulic collector (27) which is annular and inserted between said rotating support (25) and a fixed support (4), said annular hydraulic collector being partially integrated in at least one of said rotating support and said fixed support.

* * * * *